United States Patent [19]

Wicklow et al.

[11] 4,275,167
[45] Jun. 23, 1981

[54] PREFERENTIAL DEGRADATION OF LIGNIN IN GRAMINEOUS MATERIALS

[75] Inventors: Donald T. Wicklow; Robert W. Detroy, both of Peoria, Ill.

[73] Assignee: The United States of America as represented by the Secretary of Agriculture, Washington, D.C.

[21] Appl. No.: 160,754

[22] Filed: Jun. 18, 1980

[51] Int. Cl.³ .................................................. D21C 1/00
[52] U.S. Cl. ...................................................... 435/277
[58] Field of Search .......................... 435/277, 278, 279

[56] References Cited

U.S. PATENT DOCUMENTS 3,962,033  6/1976  Eriksson et al. ..................... 435/277

OTHER PUBLICATIONS

T. Kent Kirk, Phytopathology, vol. 63, pp. 1504–1507, 1973.
Paul Ander and Karl-Erik Eriksson, Material und Organismen Beiheft 3, pp. 129–140.
F. Zadrazil, European Journal of Applied Microbiology, vol. 4, pp. 273–281, 1977.
T. Kaneshiro, Development in Industrial Microbiology, vol. 18, pp. 591–598, 1977.
Chemical Abstracts, vol. 88, 172119d and 172122z, 1978.
Chemical Abstracts, vol. 93, 110660t, 1980.

*Primary Examiner*—Robert J. Warden
*Attorney, Agent, or Firm*—M. Howard Silverstein; David G. McConnell; Curtis P. Ribando

[57] ABSTRACT

By fermenting gramineous agricultural plant materials with the basidiomycete *Cyathus stercoreus*, the lignin and cellulose components are differentially modified. The resultant fermentate enriched in free cellulose has utility as an upgraded ruminant feed and as a substrate for enzymatic hydrolysis to fermentable sugar.

5 Claims, No Drawings

PREFERENTIAL DEGRADATION OF LIGNIN IN GRAMINEOUS MATERIALS

BACKGROUND OF THE INVENTION

1. Field of the Invention

This invention relates to the biological modification of the lignocellulosic components of gramineous agricultural plant materials for the purpose of making the cellulose more available for use in a variety of applications. For instance, the digestibility of lignocellulosic grasses by cattle is limited to only that portion of the cellulose which is not physically bound by the lignin component. Also, with the current trend toward the production of alcohol as a renewable energy resource, the feasibility of employing lignocellulosic residues as sources for fermentable sugars hinges on the amount of free cellulose which can be enzymatically hydrolyzed to a glucose. Typically, up to about 50% of the cellulose in natural, grassy plant tissue is rendered unavailable for such uses by the lignin associated therewith.

2. Description of the Prior Art

Studies of the degradation of lignocellulosic materials have revealed that the lignin component can be depleted disproportionately faster than the polysaccharides when acted on by some white-rot fungi [Kirk, T. K., Phytopathology 63: 1504–1507 (1973)]. An approach to optimizing the ability of such organisms to preferentially decompose the lignin in wood materials is taught by Eriksson et al., U.S. Pat. No. 3,962,033 and P. Ander et' al., Material and Organismen, Beiheft 3: 129–140, which apply a procedure for mutating spores of mycelia of wild strain white-rot fungi, and selecting the mutants having the desired degradative properties. While Eriksson teaches that these organisms can also be used for reducing the lignin content of certain grassy materials (e.g., straw and bagasse), their extent of selectivity in degrading the components of these materials is unreported. The chemical structure of grassy lignins is characteristically different from that of the woody lignins, and an organism adapted for preferentially degrading lignocellulose in one, typically will not manifest the same degree of preferentiality in the other.

Zadrazil [European J. Appl. Microbiol. 4: 273–281 (1977)] observed that a variety of basidiomycetes, including *Pleurotus cornucopiae*, Pleurotus sp. (Florida isolate), and *Stropharia rugosannulata* would generally increase the digestibility of wheat straw after about 20 days of cultivation. Kaneshiro [Dev. Ind. Microbiol. 18: 591–598 (1977)] reports preliminary results that the basidiomycetes *Pleurotus ostreatus* has potential for preferentially degrading the lignin content of feedlot waste fiber and wheat straw. In one fermentation experiment, the lignin content in a mixture of the fiber and straw was decreased from 12% to 7% with only slight depletion of the cellulose.

SUMMARY OF THE INVENTION

We have now discovered a microbiological procedure for treating gramineous plant materials, which is charaterized by the surprising result of preferentially degrading the lignin over the cellulose to an extent heretofore not observed for any known biological process. The procedure comprises inoculating the plant material with the fungal microorganism *Cyathus stercoreus*, fermenting the inoculated material under conditions favorable for the growth of the microorganism, and recovering the resultant free cellulose-enriched material from the fermentation.

In accordance with this discovery, it is an object of the invention to treat gramineous plant materials such as agricultural residues by a microbiological process which will efficiently free a substantial portion of the lignin-bound cellulose with minimal depletion of the cellulose.

It is also an object of the invention to upgrade the nutritional value of grassy plant materials for use as ruminant feed.

It is a further object of the invention to prepare a free cellulose-enriched substrate useful for subsequent enzymatic hydrolysis to fermentable glucose.

Other objects and advantages of this invention will become readily apparent from the ensuing description.

DETAILED DESCRIPTION OF THE INVENTION

The expressions "free cellulose" and "available cellulose" as used herein are defined as meaning cellulose ($\beta$-glucan) in a form which can be hydrolyzed to glucose by the enzyme cellulase under normal conditions. For all practical purposes, such cellulose can also be readily digested by ruminant animals without prior modification. The expression "free (or available) cellulose-enriched" is used herein to describe the condition whereby the percentage of free cellulose in the product is higher than that in the starting material.

Suitable lignocellulosic substrates which can be preferentially degraded by the process of this invention include fresh plant materials of grassy species belonging to the family Graminae. The term "fresh" is intended to include recently harvested as well as dried materials, but excludes plant materials previously digested by animals. Of particular interest are fresh gramineous agricultural residues; that is, the portions of grain-bearing grassy plants which remain after harvesting the seed. Illustrative of such residues without limitation thereto are wheat straw, oat straw, rice straw, corn stalks, corn husks, and the like. Due to the unique combination of chemical substructures characteristic of the natural lignins in grasses, the invention is not expected to have comparable utility when applied to other than the grassy plants.

The microorganism, *C. stercoreus* (Bird's Nest Fungus), is one of many well-known fungal colonists of grassland, ruminant and horse dung. It characteristically appears late in the decomposition sequence and forms basidiocarps on the surface of the dung. In a study of the coprophilus microorganisms [D. T. Wicklow et al., "Differential Modification of the Lignin and Cellulose Components in Wheat Straw by Fungal Colonists of Ruminant Dung: Ecological Implications," presented at the American Society for Microbiology meeting, Los Angeles, Calif., May 4–8, 1979 (published in Mycologia)] seven species of ascomycetes degraded substantially more wheat straw cellulose than they freed, with minimal breakdown of lignin. In the same study, an unidentified basidiomycete degraded cellulose approximately 50% faster than lignin and freed two times more cellulose for enzymatic hydrolysis to glucose than was available in unfermented wheat straw. Based upon these findings, we were surprised to discover that *C. stercoreus* is unique in its ability to degrade gramineous lignin at a rate on the order of twice that for degrading the associated cellulose and was able to free at least five times more cellulose for conversion to glucose than is available in unfermented wheat straw.

*C. stercoreus* can be cultivated on gramineous substrates under aerobic conditions at temperatures in the range of about 20°–30° C. and in the presence of a sufficient amount of moisture. It is necessary that water be present at a level of at least about 100% based on the dry weight of the substrate, and generally should be in the range of about 100–400%. The water may either be that which is naturally present in the material, or it may include water added to bring the moisture content up to the desired level.

Other conditions for cultivation are not particularly critical. The fermentation will naturally proceed at a pH in the range of about 6–7 and therefore does not require any pH adjustment to the medium. Since the procedure lends itself to static culture, elaborate agitation equipment is unncessary.

Incubation is continued until the enzymatic lignin degradation, as determined for example by chemical analysis, is substantially terminated. Typically, the fermentation will be completed in a period of about 30–65 days, after which the substrate can be recovered.

The amount of free cellulose available for cellulase hydrolysis to glucose in the fermented substrate is typically five to six times, and even as much as eight times, the amount found in the starting material. This represents an approximate 40–60% reduction in the level of lignin accompanied by a mere 20–25% loss of the original cellulose content.

The available cellulose-enriched plant material can be fed directly to ruminants, though it may be desirable to sterilize it by any conventional means. Alternatively, the fermented substrate can be subjected to enzymatic hydrolysis with cellulase in order to provide a fermentable source of glucose for use in the production of alcohol. Other end uses for the enriched substrate would be obvious to a person skilled in the art.

The following examples are intended only to further illustrate the invention and are not intended to limit the scope of the invention which is defined by the claims.

EXAMPLE 1

A. Isolation of *C. stercoreus*. The fungal microorganism *C. stercoreus* (Schw.) de Toni was isolated by direct transfer of tissue from immature basidiocarps from aged (6 months) and fragmented cattle dung collected from a Michigan pasture and incubated in a moist chamber for 32 days at 23° C. with a 12 hours light/12 hours dark cycle. The basidiomycete has been deposited in the Agricultural Research Culture Collection (NRRL) in Peoria, Ill., and has been assigned accession number NRRL 6473.

B. Fermentation of Wheat Straw. Arthur variety wheat straw (50.0 g., d.w.b.) was chopped into 2.5–7.5 cm. lengths and combined with 100 g. distilled water. The moistened substrate was placed in a Fernbach flask, sterilized by autoclaving, and then point inoculated with the *C. stercoreus* isolated in Example 1A. After a 62-day static culture fermentation at 25° C., the wheat straw was harvested.

C. Wheat Straw Analysis. A 50.0-g. sample of autoclaved wheat straw was used as a standard for comparison in the succeeding analysis.

The fermented substrate from Example 1B was dried to a constant weight in a forced-air drying oven at 60° C., and the biomass loss was determined by calculating the difference between the final dry weight and the initial weight (50.0 g.) before fermentation. Portions of the fermented wheat straw and the autoclaved control were ground with a "Tecator Cyclotec" sample mill equipped with a 1-mm. screen. A 1-g. sample of each of the milled residues was analyzed for cellulose and lignin contents by the method of Goering and Van Soest (U.S. Dept. Agric. Handbook No. 379, 1970 ). Using these values, the percent cellulose and lignin remaining in the fermented straw was calculated from the following formula which corrected for the loss in biomass:

$$\% A \text{ remaining} = \frac{[\text{fermented substrate wt. (g.)}] \times [\text{proportion } A \text{ in fermented sample}]}{[\text{original substrate wt. (g.)}] \times [\text{proportion } A \text{ in control sample}]} \times 100$$

wherein A is either the lignin or the cellulose.

To determine the digestibility of the fermented wheat straw to glucose, 1000 mg. of the milled sample was hydrolyzed with 10 International Units of cellulase in a shake flask at 45° C. for 4 hours. The cellulase was supplied as a stock enzyme solution buffered at pH 4.6 with citric acid and sodium phosphate. The glucose yield was determined by high-pressure liquid chromatography (HPLC). In computing the percent cellulose converted to glucose, the data were adjusted for weight gain from water addition to the glucosyl moiety on hydrolysis using the formula:

$$\% \text{ conversion} = \frac{(\text{grams glucose produced}) (162/180) (100)}{\text{dry wt. of cellulose (g.)}}$$

The results of the analysis are reported in the Table, below.

EXAMPLE 2

The fermentation of Example 1B and the analysis of Example 1C were repeated, using the same wheat straw control for comparison. The results are reported in the Table, below.

It is understood that the foregoing detailed description is given merely by way of illustration and that modification and variations may be made therein without departing from the spirit and scope of the invention.

TABLE

| Analysis of treated straw | Autoclaved wheat straw control | C. stercoreus-fermented wheat straw | |
|---|---|---|---|
| | | Example 1 | Example 2 |
| dry weight (g.) | 50.0 | 36.8 | 35.6 |
| cellulose content (%)[a] | 30.6 | 34.1 | 34.1 |
| % of initial cellulose remaining in substrate | 100 | 82.3 | 79.1 |
| cellulose lost (%) | 0 | 17.7 | 20.9 |
| lignin content (%)[a] | 10.3 | 7.78 | 7.92 |
| % of initial lignin remaining in substrate | 100 | 55.7 | 54.6 |
| lignin lost (%) | 0 | 44.3 | 45.4 |
| glucose (mg.) from 1000-mg. sample[b] | 42 | 215 | 246 |

TABLE-continued

| Analysis of treated straw | Autoclaved wheat straw control | C. stercoreus-fermented wheat straw | |
|---|---|---|---|
| | | Example 1 | Example 2 |
| % conversion of cellulose to glucose | 12 | 56.5 | 64.9 |

[a] Determined by Goering-Van Soest method.
[b] Determined by HPLC.

We claim:

1. A method for treating a fresh gramineous plant material in order to enrich said material with respect to the available cellulose content comprising the following steps:
    a. inoculating said plant material with the fungal microorganism *Cyathus stercoreus;*
    b. fermenting said inoculated plant material under conditions favorable for growth of said microorganism, whereby the lignin in said material is preferentially degraded over the cellulose; and
    c. recovering the free cellulose-enriched plant material from the fermentation of step (b).

2. The method as described in claim 1 wherein said gramineous plant material is an agricultural residue.

3. The method as described in claim 2 wherein said agricultural residue is wheat straw.

4. The method as described in claim 2 wherein said agricultural residue is corn husks.

5. The method as described in claim 2 wherein said agricultural residue is rice straw.

* * * * *